(12) United States Patent
Ohshima

(10) Patent No.: US 10,317,812 B2
(45) Date of Patent: Jun. 11, 2019

(54) IMAGE FORMING DEVICE WITH LIGHT EMITTING ELEMENT CONTROLLER AND RELATED METHOD

(71) Applicants: KABUSHIKI KAISHA TOSHIBA, Tokyo (JP); TOSHIBA TEC KABUSHIKI KAISHA, Tokyo (JP)

(72) Inventor: Masami Ohshima, Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 15/489,141

(22) Filed: Apr. 17, 2017

(65) Prior Publication Data

US 2018/0299801 A1 Oct. 18, 2018

(51) Int. Cl.
*H04N 1/06* (2006.01)
*H04N 1/29* (2006.01)
*G03G 15/04* (2006.01)
*G03G 15/043* (2006.01)

(52) U.S. Cl.
CPC ............ *G03G 15/043* (2013.01); *H04N 1/06* (2013.01); *H04N 1/295* (2013.01); *G03G 15/04054* (2013.01); *G03G 15/04063* (2013.01); *H04N 2201/0094* (2013.01)

(58) Field of Classification Search
CPC ........ G03G 15/043; H04N 1/295; H04N 1/06; H04N 2201/0094
See application file for complete search history.

(56) References Cited

U.S. PATENT DOCUMENTS

2016/0349662 A1* 12/2016 Tanaka ............. G03G 15/04054

FOREIGN PATENT DOCUMENTS

JP 2006231836 9/2006

* cited by examiner

*Primary Examiner* — Carla J Therrien
(74) *Attorney, Agent, or Firm* — Kim & Stewart LLP

(57) ABSTRACT

An image forming device according to an embodiment includes a photosensitive drum and a light-emitting unit with a plurality of light-emitting elements which form an electrostatic latent image on the photosensitive drum. A processor controls a storage unit to store a cumulative light emission time of each light-emitting element. The processor further controls the storage unit to store an adjustment time which is shorter than a longest cumulative light emission time of the light-emitting elements. When a predetermined condition is satisfied, the processor controls at least one of the light-emitting elements that has a cumulative light emission time which is shorter than the adjustment time to emit light until the cumulative light emission time thereof equals the adjustment time.

18 Claims, 13 Drawing Sheets

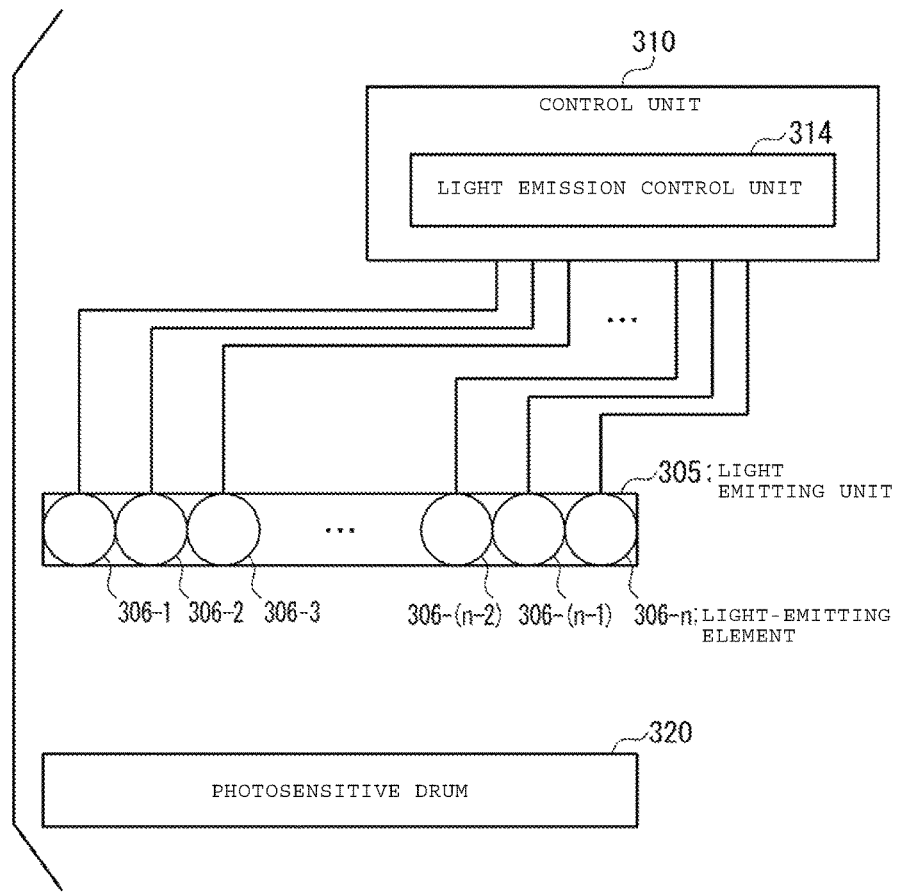

IMAGE FORMING DEVICE WITH LIGHT EMITTING ELEMENT CONTROLLER AND RELATED METHOD

FIELD

Embodiments described herein relate generally to an image forming device with a light emitting element controller and a related method.

BACKGROUND

A light-emitting element included in an image forming device degrades as it emits light. Thus, the amount of emitted light is reduced with use. If the amount of emitted light is reduced, the amount of emitted light from each light-emitting element of a light-emitting unit becomes non-uniform and print quality decreases. Accordingly, it is preferable that the amount of emitted light from each light-emitting element is uniformly maintained.

A method of uniformly adjusting the amount of emitted light of the entire light-emitting elements may be utilized. For example, drive currents of each light-emitting element may be controlled based on the amount of emitted light when each light-emitting element is measured emits light. As another example, drive currents of each light-emitting element may be controlled based on characteristic data of a cumulative drive time and the amount of emitted light of each light-emitting element. As another example, data opposite to data which forms an electrostatic latent image may be generated, thus making each light-emitting element emit light, and thereby aligning a light emission time of each light-emitting element.

However, increasing the amount of emitted light from a light-emitting element via the drive current further accelerates degradation of the light-emitting element. In addition, using light emission from the light-emitting element for aligning a light emission time of the light-emitting element can also advance degradation of the light-emitting element.

DESCRIPTION OF THE DRAWINGS

FIG. 3 is a schematic diagram of an example configuration of the light emitting unit.

FIG. 4 illustrates an example data structure with each cumulative light emission time of a light-emitting element stored in a storage unit.

DETAILED DESCRIPTION

An image forming device according to an embodiment includes a photosensitive drum and a light-emitting unit with a plurality of light-emitting elements which form an electrostatic latent image on the photosensitive drum. A processor controls a storage unit to store a cumulative light emission time of each light-emitting element. The processor further controls the storage unit to store an adjustment time which is shorter than a longest cumulative light emission time of the light-emitting elements. When a predetermined condition is satisfied, the processor controls at least one of the light-emitting elements that has a cumulative light emission time which is shorter than the adjustment time to emit light until the cumulative light emission time thereof equals the adjustment time.

Figure 1:
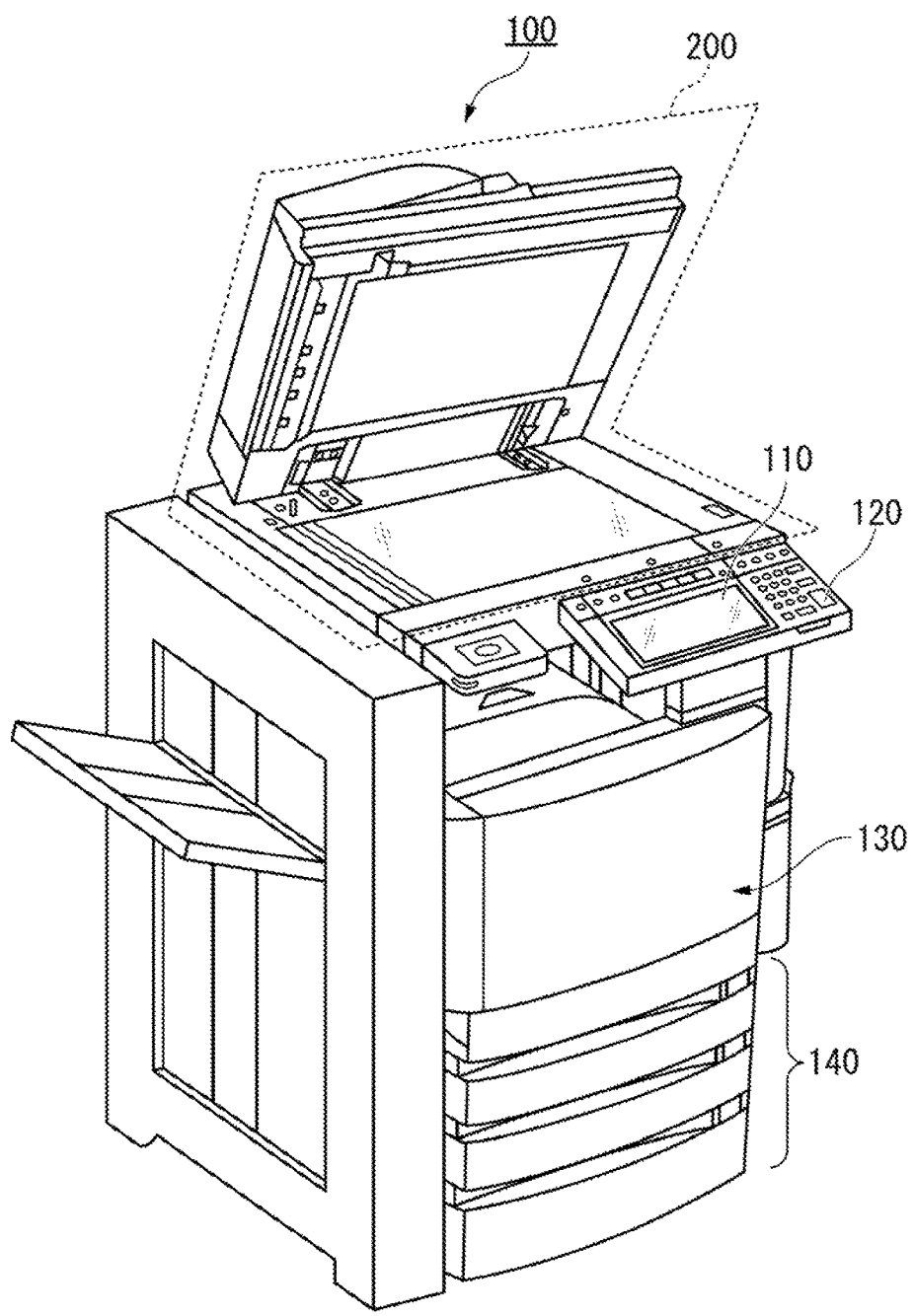
FIG. 1 is an external view of an example image forming device according to an embodiment.

FIG. 1 is an external view of an example image forming device 100 according to an embodiment. The image forming device 100 may be, for example, a multi-function peripheral (MFP). The image forming device 100 includes a display 110, a control panel 120, a print unit 130, a sheet supply unit 140, and an image reading unit 200. The print unit 130 of the image forming device 100 may be a device which fixes a toner image.

The image forming device 100 forms an image on a sheet by using a developing agent such as toner. The sheet may be, for example, paper or a label sheet. The sheet may be any type of material as long as the image forming device 100 can form an image on the material.

The display 110 is a display device such as a liquid crystal display or an organic electro luminescence display. The display 110 displays various information regarding the image forming device 100.

The control panel 120 includes a plurality of buttons. The control panel 120 receives input of a user. The control panel 120 outputs a signal according to the input which is performed by the user to a control unit of the image forming device 100. The display 110 and the control panel 120 may include a touch panel.

The print unit 130 forms an image on the sheet, based on image data which is generated by the image reading unit 200 or image data which is received through a communication interface. The print unit 130 forms an image according to, for example, the following processing. An image forming unit of the print unit 130 forms an electrostatic latent image on a photosensitive drum, based on the image data. The image forming unit of the print unit 130 forms a visible image by depositing developing agent on the electrostatic latent image. The toner is a specific example of the developing agent. A transfer unit of the print unit 130 transfers a visible image onto the sheet. A fixing unit of the print unit 130 fixes the visible image on the sheet by heating or pressing the sheet. The sheet on which an image is formed may be a sheet which is contained in the sheet containing unit 140, and may be a sheet pointed by a hand.

The sheet containing unit 140 contains sheets which are used for image formation of the print unit 130.

The image reading unit 200 generates image data corresponding to a read target using brightness and darkness of light. The image reading unit 200 stores the image data. The image data may be transmitted to other information processing devices through a network. The image data may be used to form an image on the sheet by using the print unit 130.

Figure 2:
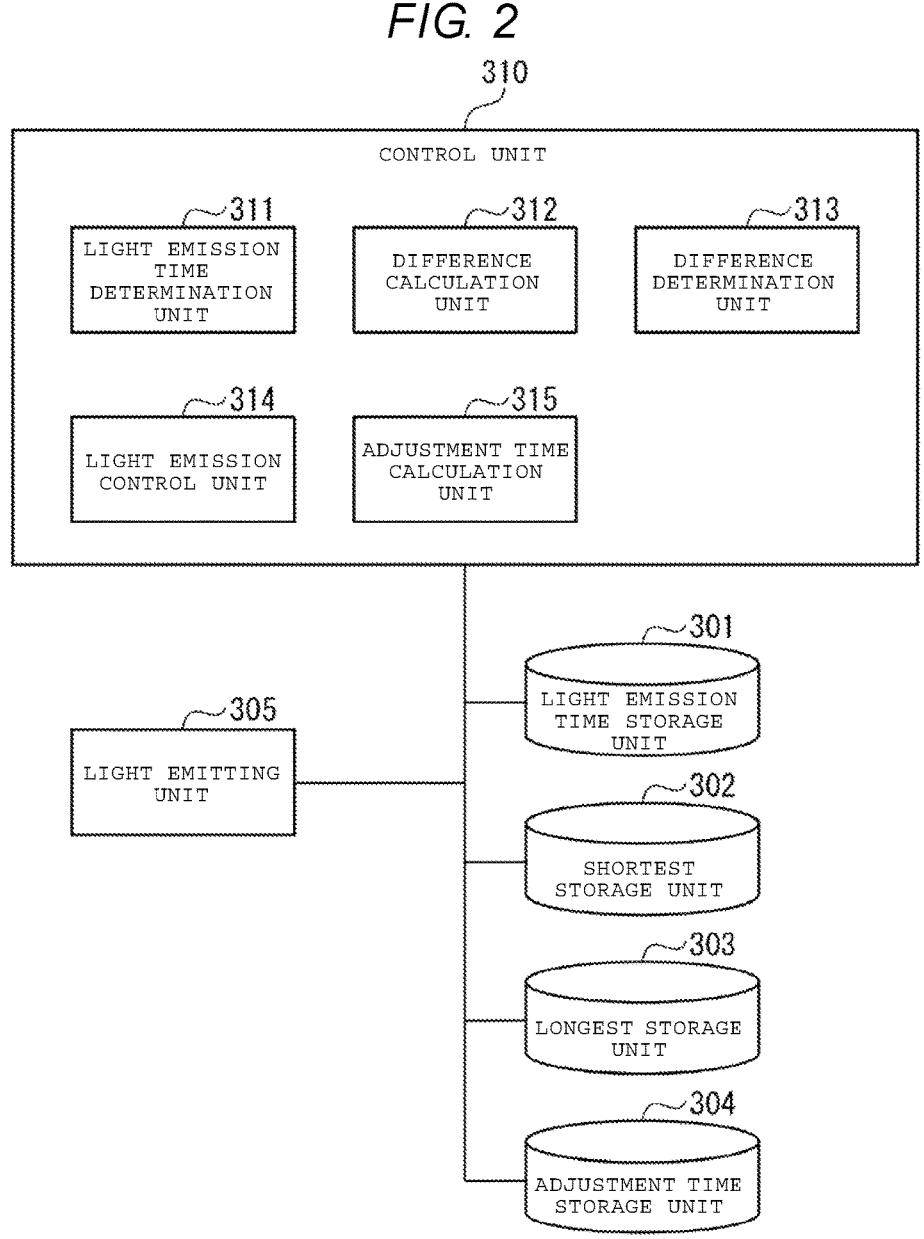
FIG. 2 is a functional block diagram illustrating an example functional configuration of a light emitting unit.

FIG. 2 is a functional block diagram illustrating an example functional configuration of a light emitting unit 305 according to the embodiment. The image forming device 100 includes a light emission time storage unit 301, a shortest storage unit 302, a longest storage unit 303, an adjustment time storage unit 304, a light emitting unit 305, and a control unit 310. In one embodiment, the control unit 310 is a processor programmed to carry out the various functions described below. In another embodiment, the control unit 310 is a hardware controller, e.g., an application specific integrated circuit (ASIC) and field programmable gate array (FPGA), that is configured to carry out the functions described below.

The light emission time storage unit 301, the shortest storage unit 302, the longest storage unit 303, and the adjustment time storage unit 304 may be implemented in a single storage device or multiple storage devices. The storage device may be a magnetic hard disk, a semiconductor memory device, or the like. The controller 310 is programmed to control the storage device(s) to read and write information according to the various functions described with respect to the light emission time storage unit 301, the shortest storage unit 302, the longest storage unit 303, and the adjustment time storage unit 304.

The light emission time storage unit 301 stores each of the cumulative light emission times of a plurality of light-emitting elements 306 included in the light emitting unit 305. The cumulative light emission times are the sum of the light emission times that the light-emitting elements 306 emit. The cumulative light emission times are stored for each light-emitting element 306. The light emission time storage unit 301 stores a plurality of cumulative light emission times. Each time one of the light-emitting elements 306 emits light, the corresponding one cumulative light emission time increases. The cumulative light emission time is used for adjusting the amount of light of the light emitting unit 305.

The shortest storage unit 302 stores the smallest value of the cumulative light emission times of the plurality of light-emitting elements stored in the light emission time storage unit 301. The cumulative light emission time stored in the shortest storage unit 302 is used when a difference value is calculated by a difference calculation unit 312, described below. In the present embodiment, only the shortest value is stored. However, for example, the three shortest cumulative light emission times may be selected and an average thereof may be stored.

The longest storage unit 303 stores the largest value among the cumulative light emission times of the plurality of light-emitting elements which are stored in the light emission time storage unit 301. If a larger value than the cumulative light emission time stored in the longest storage unit 303 occurs among the plurality of cumulative light emission time stored in the light emission time storage unit 301, the value stored in the longest storage unit 303 is updated accordingly.

The cumulative light emission time stored in the longest storage unit 303 is used when a difference value is calculated by the difference calculation unit 312, described below. In the embodiment, only the largest value is stored. However, for example, the three largest cumulative light emission times may be selected, and an average thereof may be stored.

The adjustment time storage unit 304 stores an adjustment time. The adjustment time is shorter than the cumulative light emission time stored in the longest storage unit 303, and is longer than the cumulative light emission time stored in the shortest storage unit 302. In the embodiment, a value of (cumulative light emission time stored in the longest storage unit 303—cumulative light emission time stored in the shortest storage unit 302)÷2 is used. The adjustment time may be calculated by using any other method. The light-emitting element 306 in which the cumulative light emission time stored in the light emission time storage unit 301 is shorter than the adjustment time is controlled to emit light until the stored adjustment time.

The control unit 310 controls an operation of each unit of the image forming device 100. The control unit 310 is realized by a device including, for example, a central processing unit (CPU) and a random access memory (RAM). The control unit 310 is programmed to function as a light emission time determination unit 311, the difference calculation unit 312, a difference determination unit 313, a light emission control unit 314, and an adjustment time calculation unit 315, by executing an image formation software program.

The light emission time determination unit 311 updates the shortest storage unit 302 and the longest storage unit 303. Updating of the shortest storage unit 302 will be first described. The light emission time determination unit 311 determines whether or not the cumulative light emission time stored in the shortest storage unit 302 and the plurality of cumulative light emission times stored in the light emission time storage unit 301 satisfy a predetermined condition. In a case where the plurality of cumulative light emission times stored in the light emission time storage unit 301 are compared with the cumulative light emission time stored in the shortest storage unit 302, the predetermined condition may be, for example, whether or not any cumulative light emission time of the light-emitting elements 306 is shorter than the cumulative light emission time stored in the shortest storage unit 302.

Next, updating of the longest storage unit 303 will be described. In a case where the plurality of cumulative light emission times stored in the light emission time storage unit 301 are compared with the cumulative light emission time stored in the longest storage unit 303, the predetermined condition may be, for example, whether or not the cumulative light emission time of the light-emitting element 306 is longer than the cumulative light emission time stored in the longest storage unit 303. The predetermined condition may be any condition as long as a magnitude relationship between the cumulative light emission time stored in the shortest storage unit 302 or the longest storage unit 303 and the cumulative light emission time of the light-emitting element 306 can be compared. If the predetermined condition is satisfied, the light emission time determination unit 311 stores the cumulative light emission time of the light-emitting element 306 in the shortest storage unit 302 or the longest storage unit 303, depending on whichever is determined.

The difference calculation unit 312 calculates a difference value between the cumulative light emission time stored in the longest storage unit 303 and the cumulative light emission time stored in the shortest storage unit 302.

The difference determination unit 313 determines whether or not the difference value calculated by the difference calculation unit 312 is smaller than a forced light emission threshold. The forced light emission threshold is a value that determines whether or not the light-emitting element 306 is controlled to emit light. In a case where the difference value is smaller than the forced light emission threshold, the light emission control unit 314 does not control the light-emitting element 306 to emit light. In contrast, in a case where the difference value is larger than or equal to the forced light emission threshold, the light emission control unit 314 controls the light-emitting element 306 to emit light. The forced light emission threshold is stored in the image forming device 100 in advance.

The light emission control unit 314 controls light emission of the light emitting element 306. The light emission control unit 314 increases the cumulative light emission time of the light-emitting element 306 when the light-emitting element 306 emits light. The light emission control unit 314 stores the cumulative light emission time of the light-emitting element 306 in the light emission time storage unit 301. The light emission control unit 314 determines whether or not the cumulative light emission time of the light-emitting element 306 is shorter than the adjustment time. In a case where the cumulative light emission time of the light-emitting element 306 is shorter than the adjustment time, the light emission control unit 314 generates data which causes the light-emitting element 306 emit light. In a case where the cumulative light emission time of the light-emitting element 306 is shorter than the adjustment time, the light emission control unit 314 generates data which does not cause the light-emitting element 306 emit light. The light emission control unit 314 transmits the generated data to the light emitting unit 305. The adjustment time indicates a time in which the light-emitting element 306 is controlled to emit light. If the cumulative light emission time of the light-emitting element 306 is smaller than the adjustment time, the light emission control unit 314 controls the light-emitting element 306 to emit light for a time period equal to the adjustment time. The adjustment time is stored in the image forming device 100 in advance. As such, the light emission control unit 314 keeps the cumulative time of emitting light by controlling the light-emitting element 306 emit light as needed. It is preferable that the forced light emission is performed after an image formation processing, but may be performed before the image formation processing.

The adjustment time calculation unit 315 calculates the adjustment time. The adjustment time calculation unit 315 stores the adjustment time in the adjustment time storage unit 304, when the adjustment time is calculated.

FIG. 3 is schematic diagram of an example configuration of the light emitting unit 305 according to the embodiment. The light emitting unit 305 includes a plurality of light-emitting elements 306-1 to 306-*n* (generally referred to as "light-emitting elements 306"). Each of the light-emitting elements 306 is connected to the light emission control unit 314. Each of the light-emitting elements 306 emits light in response to a light emission instruction from the light emission control unit 314. Data which causes light to be emitted is an aspect of the light emission instruction. The light-emitting elements 306 form electrostatic latent image in a photosensitive drum 320 by emitting light during image formation processing. The light-emitting elements 306 may be organic electro luminescence (EL), or may be a light emitting diode (LED). The light-emitting elements 306 may be any type of photosensitive element as long as the electrostatic latent image can be formed in photosensitive drum 320.

The photosensitive drum 320 is provided in a light emission direction of the light-emitting elements 306. The photosensitive drum 320 forms the electrostatic latent image based on the image data.

FIG. 4 illustrates an example data structure with each cumulative light emission time of a light-emitting element 306 stored in the light emission time storage unit 301. In the example illustrated in FIG. 4, an ID of the light-emitting element and a value of the corresponding cumulative light emission time (minutes) are stored in the same record. The uppermost record of the light emission time storage unit 301 shows an ID of a light-emitting element of "306-1" and a value of the cumulative light emission time (minutes) of "300". Hence, the record indicates that the light-emitting element 306-1 has is emitted light for 300 minutes.

Figure 5:
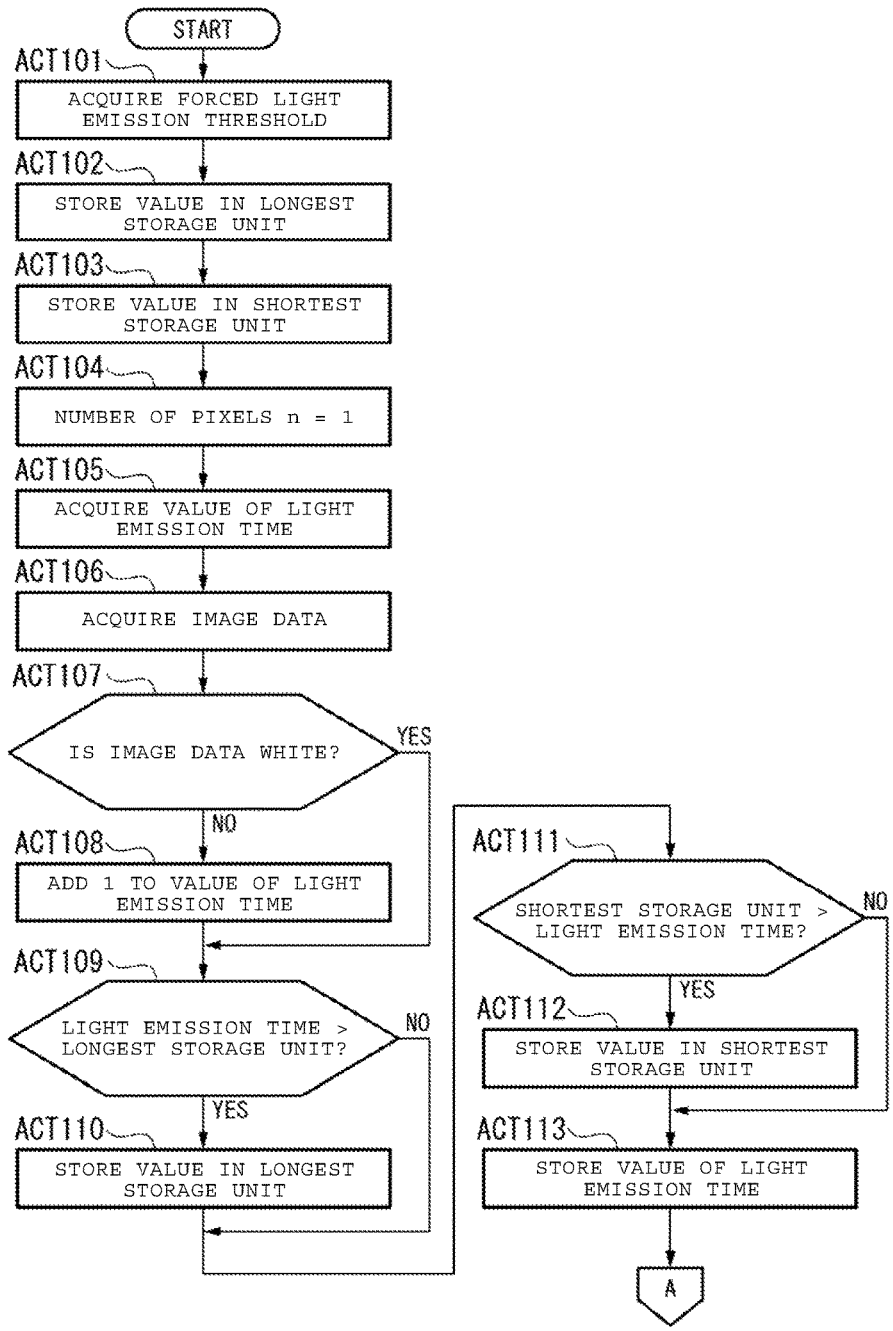
FIGS. 5 and 6 are flowcharts illustrating an example sequence of operations for determining whether to control a light-emitting element to emit light.
Figure 6:
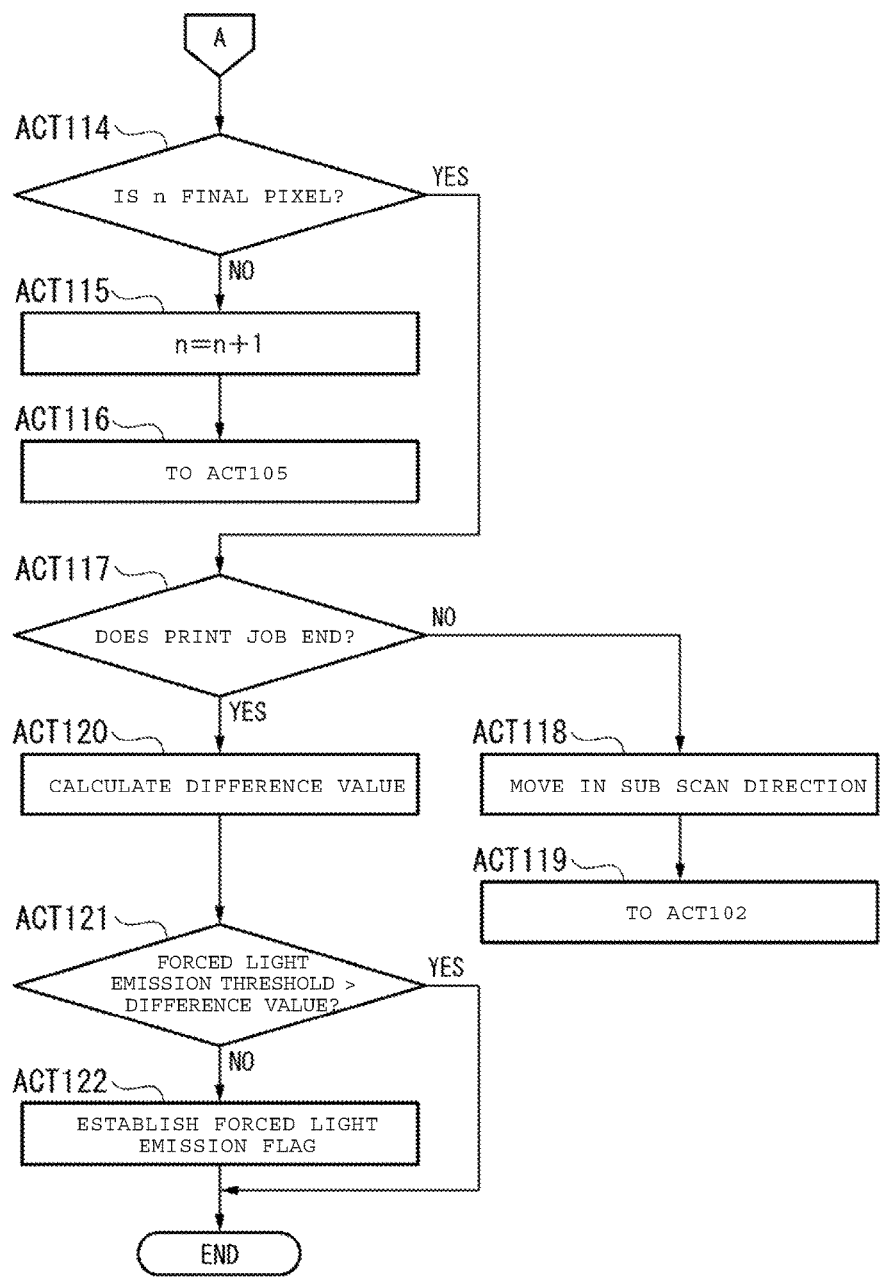

FIG. 5 and FIG. 6 are flowcharts illustrating an example sequence of operations for determining whether to control the light-emitting element 306 according to emit light. The control unit 310 acquires a forced light emission threshold (ACT101). The control unit 310 sets a value of zero in the longest storage unit 303 (ACT102). The control unit 310 sets a maximum value (for example, MAX) that the shortest storage unit 302 can store in the shortest storage unit 302 (ACT103). The control unit 310 sets a variable n which counts the number of pixels in a main scan direction of image data as "1" (ACT104). The control unit 310 acquires a value of the cumulative light emission time of each of the light-emitting elements 306 corresponding to an nth pixel from the light emission time storage unit 301 (ACT105). Hereinafter, the cumulative light emission time of the nth light-emitting element 306 in the main scan direction that the control unit 310 acquires is referred to as "light emission time". The control unit 310 acquires an nth pixel in the main scan direction from image data (ACT106).

The control unit 310 determines whether or not the acquired one pixel of the image data is white (ACT107). In a case where the acquired one pixel of the image data is not white (ACT107: NO), the light emission control unit 314 adds "1" to the value light emission time (ACT108). If the acquired one pixel of the image data is white (ACT107: YES), no processing is performed.

The light emission time determination unit 311 determines whether or not the value of the light emission time is larger than the value of the cumulative light emission time stored in the longest storage unit 303 (ACT109). If the value of the light emission time is larger than the value of the cumulative light emission time stored in the longest storage unit 303 (ACT109: YES), the light emission time determination unit 311 stores the value of the light emission time in the longest storage unit 303 (ACT110). If the value of the light emission time is not larger than the value of the cumulative light emission time stored in the longest storage unit 303 (ACT109: NO), no processing is performed.

The light emission time determination unit 311 compares the light emission time and the cumulative light emission time stored in the shortest storage unit 302 and determines whether or not the cumulative light emission time stored in the shortest storage unit 302 is shorter (ACT111). If a value of the light emission time is smaller than a value of the cumulative light emission time stored in the shortest storage unit 302 (ACT111: YES), the light emission time determination unit 311 stores the value of the light emission time in the shortest storage unit 302 (ACT112). If the cumulative light emission time of the light-emitting elements 306 is not smaller than the value of the cumulative light emission time stored in the shortest storage unit 302 (ACT111: NO), no processing is performed.

The light emission control unit 314 stores the value of the light emission time as the value of the cumulative light emission time of the light-emitting elements 306-$n$ of the light emission time storage unit 301 (ACT113). The control unit 310 determines whether or not n is equal to the final pixel in the main scan direction (ACT114). If n does not reach the final pixel in the main scan direction (ACT114: NO), the control unit 310 adds "1" to n (ACT115). If ACT115 ends, processing moves to ACT105 (ACT116).

If n is equal to the final pixel in the main scan direction (ACT114: YES), the control unit 310 determines whether or not print job ends (ACT117). If the print job does not end (ACT117: NO), the control unit 310 moves the light emitting unit 305 in a sub scan direction (ACT118). If ACT115 ends, processing moves to ACT102 (ACT119). If the print job ends (ACT117: YES), the difference calculation unit 312 calculates a difference value between a value of the cumulative light emission time stored in the longest storage unit 303 and a value of the cumulative light emission time stored in the shortest storage unit 302 (ACT120). The difference calculation unit 312 determines whether or not the calculated difference value is smaller than the forced light emission threshold (ACT121). If the calculated difference value is smaller than the forced light emission threshold (ACT121: YES), no processing is performed. If the calculated difference value is not smaller than the forced light emission threshold (ACT121: NO), the control unit 310 establishes a forced light emission flag (ACT122).

Figure 7A:
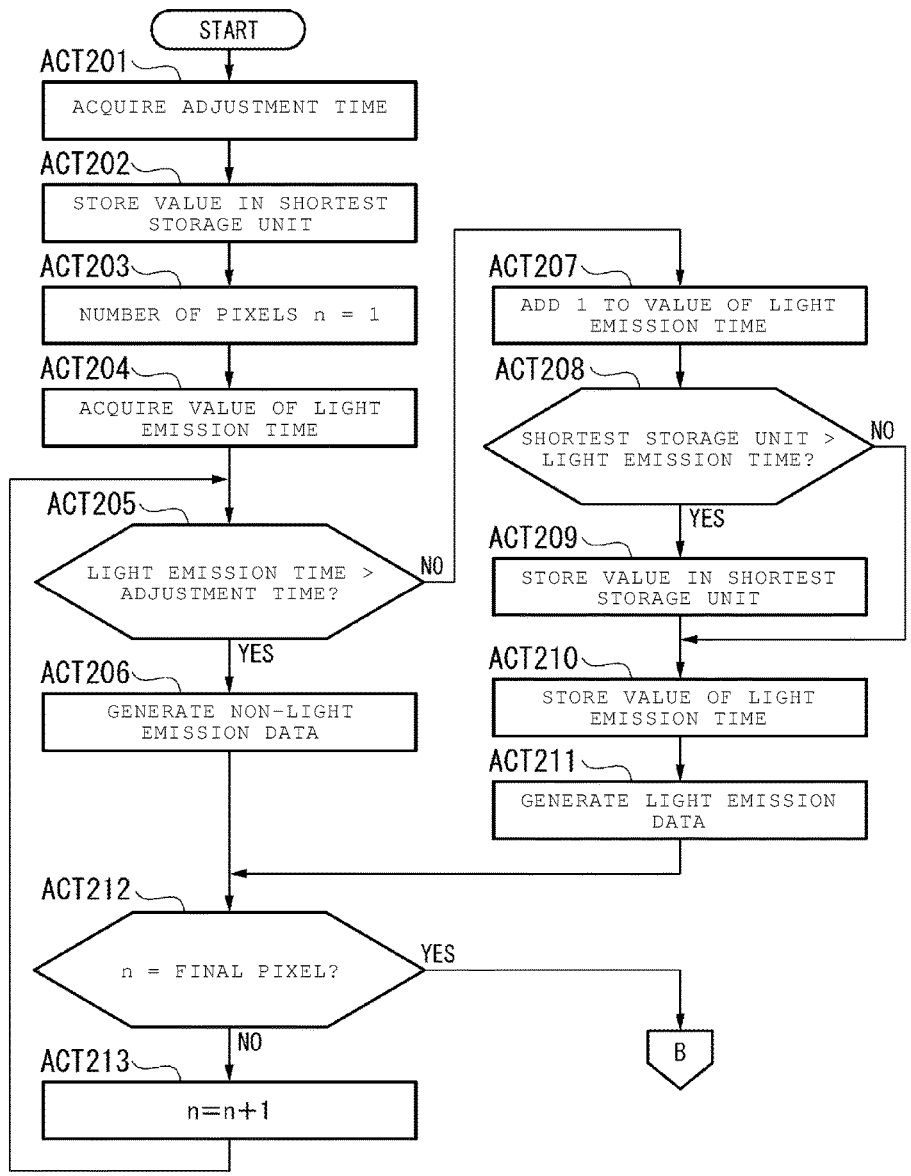
FIGS. 7A and 7B are flowcharts illustrating an example sequence of operations for determining an adjustment time when the light-emitting element is controlled to emit light.
Figure 7B:
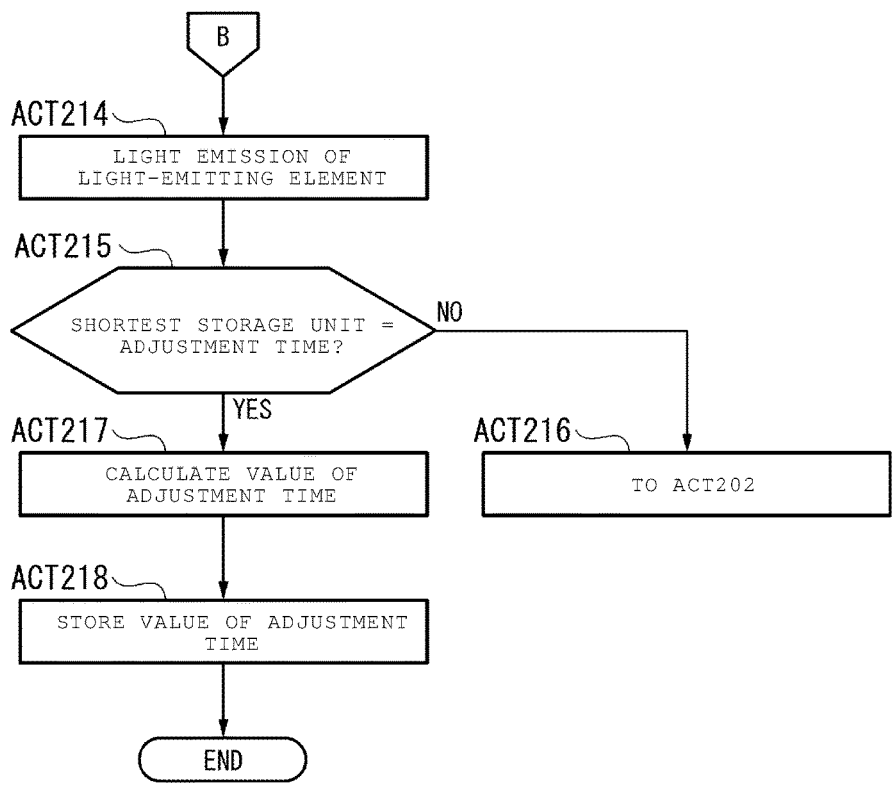

FIGS. 7A and 7B are flowcharts illustrating an example sequence of operations for determining an adjustment time when the light-emitting element is controlled to emit light. The control unit 310 acquires a value of the adjustment time (ACT201). The control unit 310 sets a value of the adjustment time to the shortest storage unit 302 (ACT202). The control unit 310 sets "1" as the variable n which counts the number of pixels of the image data in the main scan direction (ACT203). The control unit 310 acquires a value of the cumulative light emission time (hereinafter, referred to as "light emission time") of the light-emitting elements 306 corresponding to an nth pixel in main scan direction from the light emission time storage unit 301 (ACT204).

The light emission control unit 314 determines whether or not a value of the light emission time is larger than a value of the adjustment time (ACT205). If the value of the light emission time is larger than the value of the adjustment time (ACT205: YES), the light emission control unit 314 generates non-light emission data which indicates that the light-emitting elements 306 does not emit light (ACT206). If the value of the light emission time is not larger than the value of the adjustment time (ACT205: NO), the light emission control unit 314 adds "1" to the value of the light emission time (ACT207). The light emission time determination unit 311 determines whether or not the cumulative light emission time stored in the shortest storage unit 302 is larger than the value of the light emission time (ACT208). If the cumulative light emission time is larger than the value of the light emission time (ACT208: YES), the light emission time determination unit 311 stores the value of the light emission time in the shortest storage unit 302 (ACT209). If the cumulative light emission time is not larger than the value of the light emission time (ACT208: NO), no processing is performed. The light emission control unit 314 stores the value of the light emission time as a value of the cumulative light emission time of the light-emitting element 306-$n$ of the light emission time storage unit 301 (ACT210). The light emission control unit 314 generates light emission data indicating that the light-emitting elements 306 emit light (ACT211).

The control unit 310 determines whether or not n is equal to the final pixel in the main scan direction (ACT212). If n does not reach the final pixel in the main scan direction (ACT212: NO), the control unit 310 adds "1" to n (ACT213). If n is equal to the final pixel in the main scan direction (ACT212: YES), the light emission control unit 314 transmits data which is generated to the light emitting unit 305 and controls the light-emitting elements 306 to emit light (ACT214).

The light emission control unit 314 determines whether or not the value of the cumulative light emission time stored in the shortest storage unit 302 is equal to the value of the adjustment time (ACT215). If the values are not equal (ACT215: NO), processing moves to ACT202 (ACT216). If the values are equal (ACT216: YES), the adjustment time calculation unit 315 calculates the adjustment time (ACT217). The adjustment time calculation unit 315 stores the adjustment time in the adjustment time storage unit 304 and then ends processing (ACT218).

Figure 8:
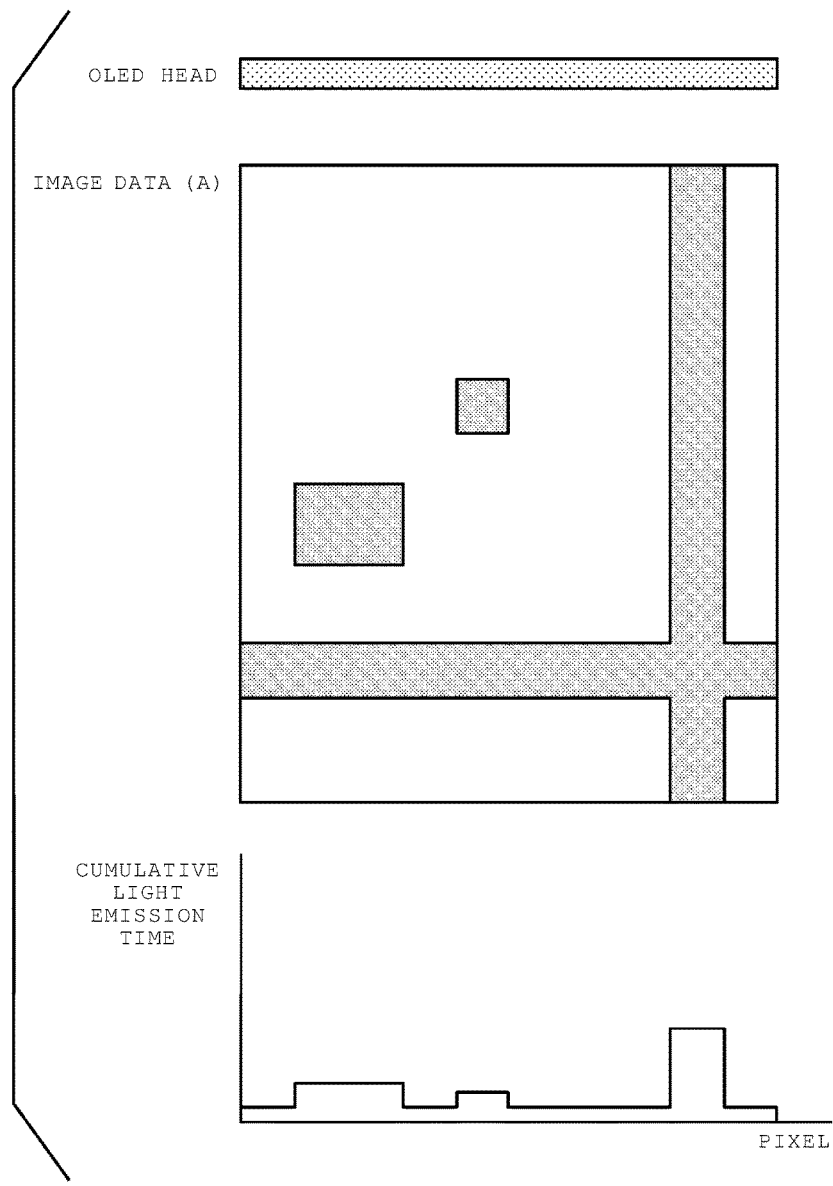
FIG. 8 is a diagram illustrating a cumulative light emission time of the light-emitting element in a case where image data is printed.

FIG. 8 is a diagram illustrating the cumulative light emission time of the light-emitting element 306 when image data (A) is printed. The cumulative light emission time of the light-emitting elements 306 differs for each image data. The image data (A) includes a black pixel extending from the first pixel to the final pixel in at least one row in the main scan direction. Accordingly, all the light-emitting elements 306 included in the light emitting unit 305 emit light for image formation. An OLED head is an aspect of the light emitting unit 305.

Figure 9:
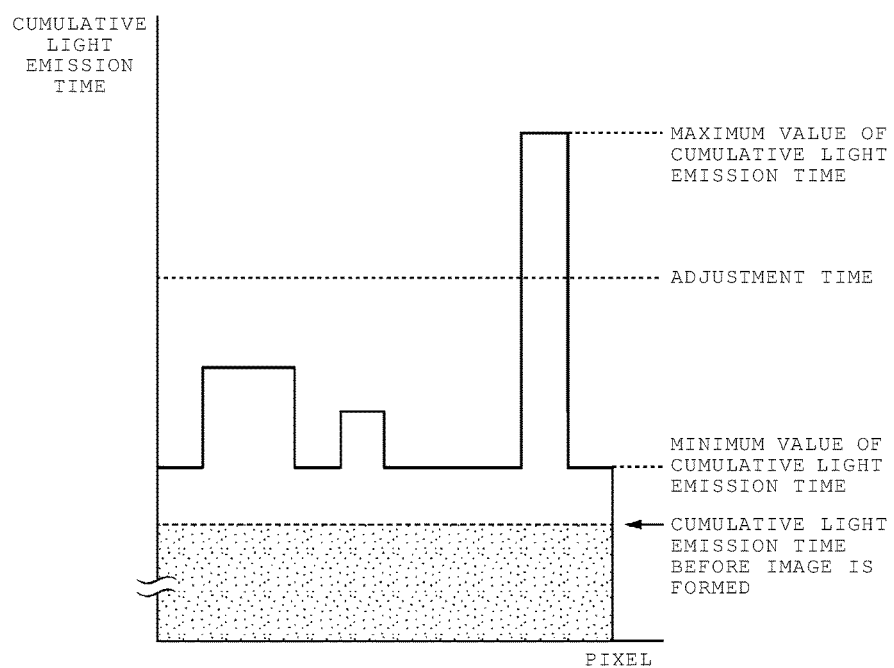
FIG. 9 is a diagram illustrating the cumulative light emission time of the light-emitting element after five copies of the image data are printed.

FIG. 9 is a diagram illustrating the cumulative light emission time of the light-emitting element 306 after five copies of the image data (A) are printed. If a difference between a maximum value of the cumulative light emission time and a minimum value of the cumulative light emission time is larger than the forced light emission threshold, the light-emitting elements 306 in which the cumulative light emission time is shorter than the adjustment time are each controlled to emit light until the cumulative light emission time equals adjustment time.

Figure 10:
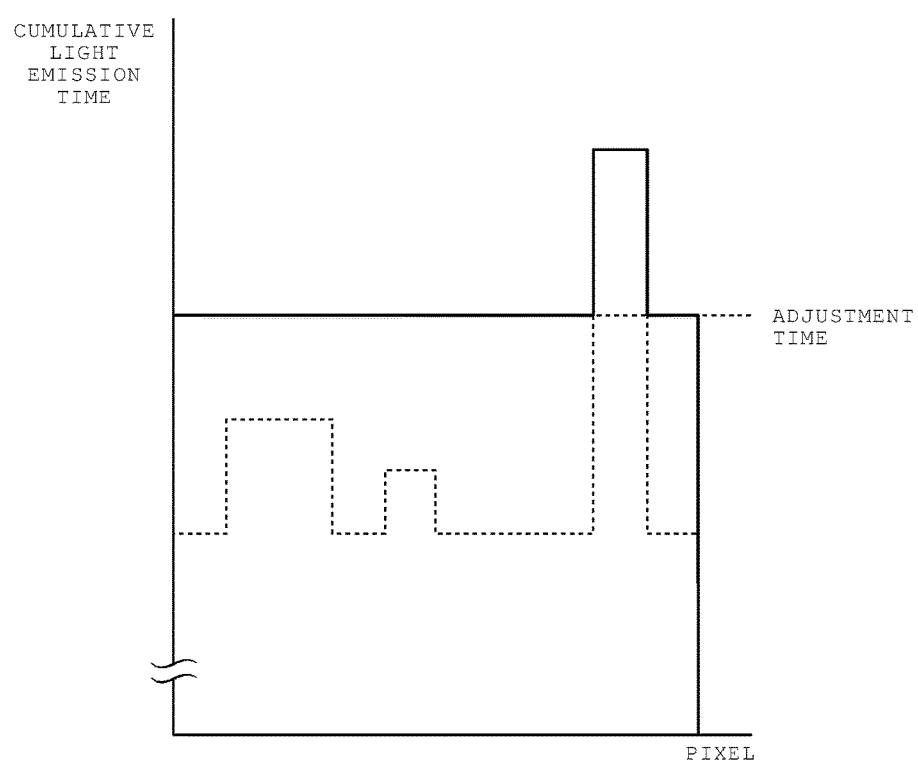
FIG. 10 is a diagram illustrating a state where the cumulative light emission time of light-emitting element is equal to an adjustment time after five copies of the image data are printed.

FIG. 10 is a diagram illustrating a state where the cumulative light emission time of light-emitting element 306 is equal to the adjustment time after five copies of the image data (A) are printed. The light emission control unit 314 controls the light-emitting elements 306 in which the cumulative light emission time is shorter than the adjustment time to emit light until the cumulative light emission time equals the adjustment time. Accordingly, all the light-emitting elements 306 have the cumulative light emission time longer than or equal to the adjustment time.

Figure 11:
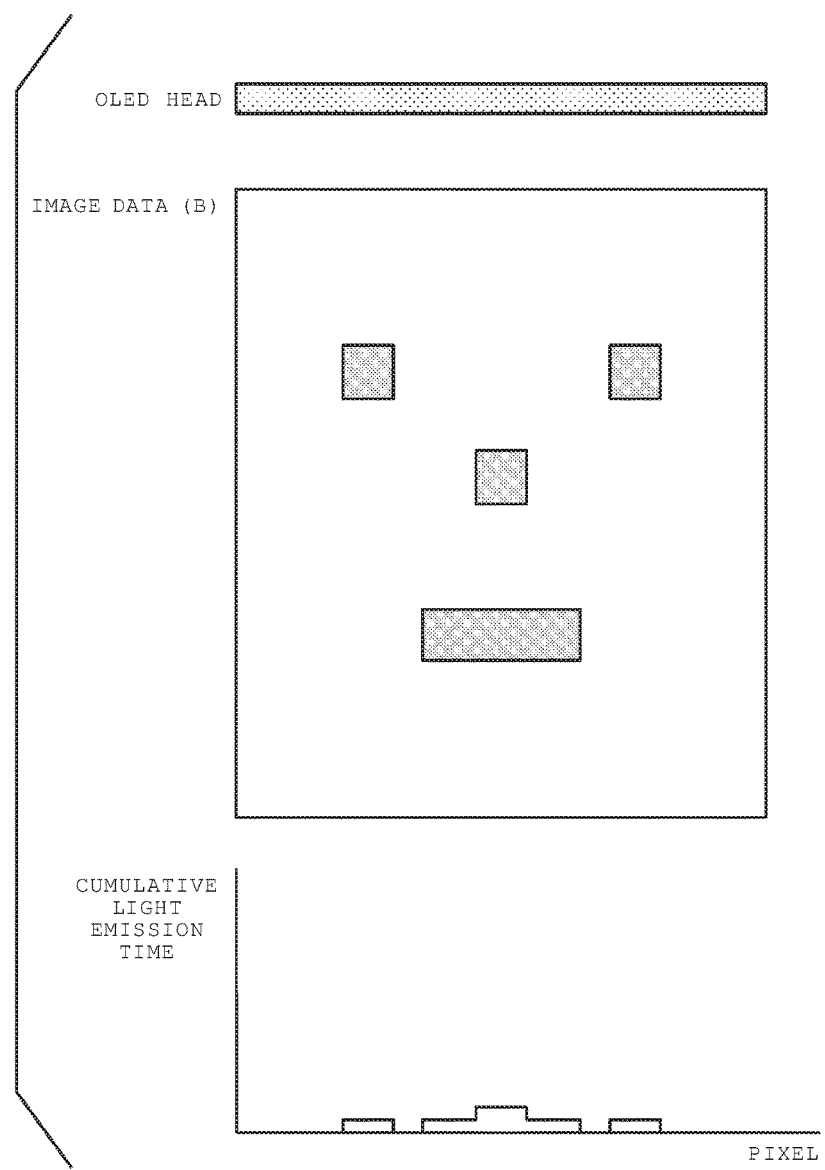
FIG. 11 is a diagram illustrating the cumulative light emission time of the light-emitting element in a case where another image data is printed.

FIG. 11 is a diagram illustrating the cumulative light emission time of the light-emitting element 306 when image data (B) is printed. Unlike a case where the image data (A) is printed, although the image data (B) is printed, at least one light-emitting element 306 does not emit light.

Figure 12:
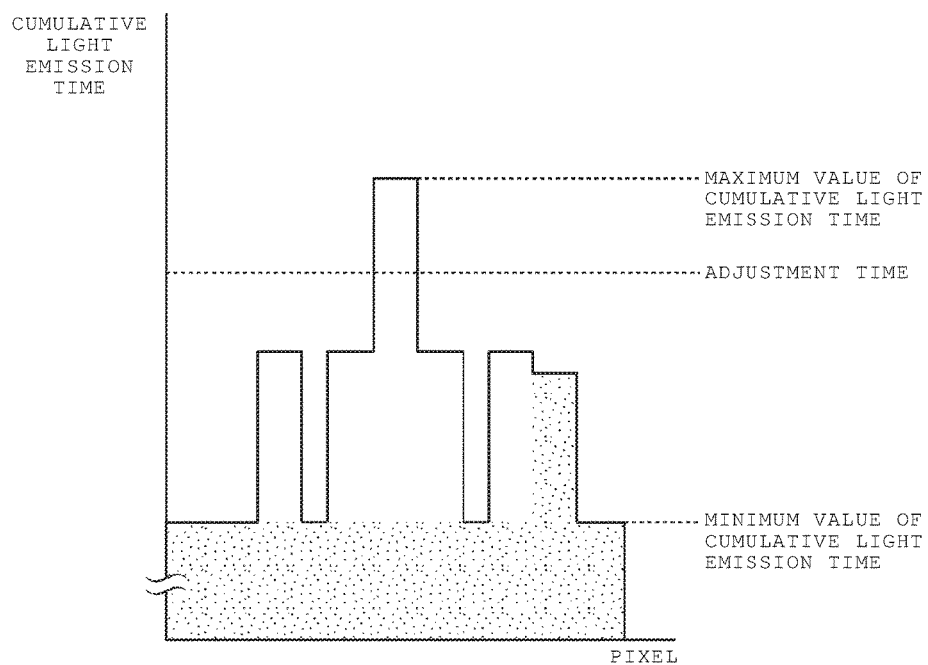
FIG. 12 is a diagram illustrating the cumulative light emission time of the light-emitting element after 15 copies of another image data are printed.

FIG. 12 is a diagram illustrating the cumulative light emission time of the light-emitting element 306 after 15 copies of the image data (B) are printed. A light-emitting element 306 shortly after five copies of the image data (A) are printed is used as the light-emitting element 306. When a difference between a maximum value of the cumulative light emission time and a minimum value of the cumulative light emission time is larger than the forced light emission threshold, the light-emitting element 306 in which the cumulative light emission time is shorter than the adjustment time is controlled to emit light.

Figure 13:
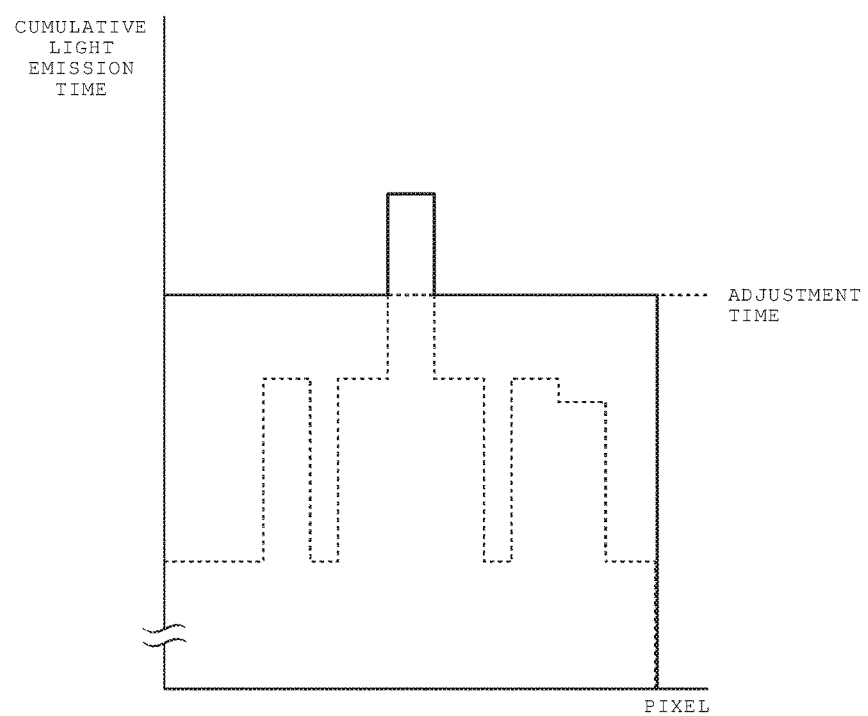
FIG. 13 is a diagram illustrating a state where the cumulative light emission time of the light-emitting element is equal to the adjustment time after 15 copies of another image data are printed.

FIG. 13 is a diagram illustrating a state where the cumulative light emission time of the light-emitting element 306 is equal to the adjustment time after 15 copies of the image data (B) are printed. The light-emitting elements 306 in which the cumulative light emission time is shorter than the adjustment time emits light until the cumulative light emission time equals the adjustment time. Accordingly, all the light-emitting elements 306 have the cumulative light emission time longer than or equal to the adjustment time.

As such, the light emission control unit 314 determines whether or not the value of the cumulative light emission time stored in the light emission time storage unit 301 is larger than the value of the adjustment time. As a result of determination, in a case where the value of the cumulative light emission time is not larger than the value of the adjustment time, the light emission control unit 314 performs control such that the light-emitting elements 306 emit light. In contrast, in a case where the value of the cumulative light emission time is larger than the value of the adjustment time, the light emission control unit 314 performs control such that the light-emitting elements 306 do not emit light. Accordingly, the light emission control unit 314 controls the light-emitting elements 306 in which the value of the cumulative light emission time is not larger than the value of the adjustment time to emit light until the cumulative light emission time equals the adjustment time. Hence, although the light-emitting element 306 emits light until the cumulative light emission time equals the largest value of the cumulative light emission time, the light emission time is shortened by a difference between the value of the cumulative light emission time and the value of the adjustment time. Accordingly, the light-emitting elements 306 uniformly maintain the amount of emitted light and are prevented from being degraded relative to one another due to a difference in cumulative light emission.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming device, comprising:
a photosensitive drum;
a light-emitting unit that includes a plurality of light-emitting elements which form an electrostatic latent image on the photosensitive drum;
a storage unit; and
a processor configured to:
control the storage unit to store a cumulative light emission time of each light-emitting element of the plurality of light emitting elements,
control the storage unit to store an adjustment time which is shorter than a longest cumulative light emission time of the plurality of light-emitting elements,
calculate a difference between the longest cumulative light emission time and a shortest cumulative light emission time of the light-emitting elements, and when the difference is equal to or greater than a predetermined threshold, control each of the plurality of light-emitting elements that has a cumulative light emission time which is shorter than the adjustment time to emit light until the cumulative light emission time thereof equals the adjustment time.

2. The image forming device according to claim 1, wherein the difference is calculated after the electrostatic latent image has been formed on the photosensitive drum.

3. The image forming device according to claim 1, wherein the processor is further configured to control the storage unit to store the longest cumulative light emission time from among the cumulative light emission times of the light-emitting elements.

4. The image forming device according to claim 3, wherein the processor is further configured to control the storage unit to store the shortest cumulative light emission time from among the cumulative light emission times of the light-emitting elements.

5. The image forming device according to claim 4, wherein the difference is a difference between the stored longest cumulative light emission time and the stored shortest cumulative light emission time.

6. The image forming device according to claim 5, wherein the processor calculates the adjustment time based on the difference.

7. The image forming device according to claim 1, wherein the plurality of light-emitting elements are organic ELs.

8. A light-emitting element control method, comprising:
forming an electrostatic image on a photosensitive drum by emitting light from one or more of a plurality of light-emitting elements;
storing a cumulative light emission time of each light-emitting element of the plurality of light-emitting elements;
storing an adjustment time which is shorter than a longest cumulative light emission time of the plurality of light-emitting elements;
calculating a difference between the longest cumulative light emission time and a shortest cumulative light emission time of the light-emitting elements; and
when the difference is equal to or greater than a predetermined threshold, controlling each of the light-emitting elements that has a cumulative light emission time which is shorter than the adjustment time to emit light until the cumulative light emission time thereof equals the adjustment time.

9. The method according to claim 8, wherein the difference is calculated after the electrostatic image has been formed on the photosensitive drum.

10. The method according to claim 8, further comprising:
storing the longest cumulative light emission time from among the cumulative light emission times of the light-emitting elements.

11. The method according to claim 10, further comprising:
storing the shortest cumulative light emission time from among the cumulative light emission times of the light-emitting elements.

12. The method according to claim 11, wherein the difference is a difference between the stored longest cumulative light emission time and the stored shortest cumulative light emission time.

13. The method according to claim 12, wherein the adjustment time is calculated based on the difference.

14. The method according to claim 8, wherein the plurality of light-emitting elements are organic ELs.

15. A light emitting element controller for an image forming device, comprising:
a processor and associated memory, wherein the processor is configured to:
control one or more of a plurality of light-emitting elements of the image forming device to form an electrostatic image on a photosensitive drum of the image forming device;
store in a storage unit of the image forming device a cumulative light emission time of each light-emitting element of the plurality of elements;
store in the storage unit an adjustment time which is shorter than a longest cumulative light emission time of the plurality of light-emitting elements;
calculating a difference between the longest cumulative light emission time and a shortest cumulative light emission time of the light-emitting elements; and
when the difference is equal to or greater than a predetermined threshold, control each of the light-emitting elements that has a cumulative light emission time which is shorter than the adjustment time to emit light until the cumulative light emission time thereof equals the adjustment time.

16. The controller according to claim 15, wherein
the processor stores in the storage unit the longest and the shortest cumulative light emission time from among the cumulative light emission times of the light-emitting elements.

17. The controller according to claim 16, wherein:
the difference is a difference between the stored longest cumulative light emission time and the stored shortest cumulative light emission time, and
the adjustment time is calculated based on the difference.

18. The controller according to claim 15, wherein the difference is calculated after completion of forming the electrostatic image on the photosensitive drum.

* * * * *